United States Patent [19]

Linton et al.

[11] 4,065,860
[45] Jan. 3, 1978

[54] WEAPON TRAINING SIMULATOR

[75] Inventors: John D. Linton, Palatine; Samuel P. Willits; William L. Mohan, both of Barrington, all of Ill.

[73] Assignee: Spartanics, Ltd., Rolling Meadows, Ill.

[21] Appl. No.: 615,414

[22] Filed: Sept. 22, 1975

[51] Int. Cl.² .......................... F41J 5/02; G09F 11/04
[52] U.S. Cl. .......................................... 35/25; 40/474; 273/101.1; 273/102.2 B
[58] Field of Search ................... 35/25, 12 N; 40/132, 40/33, 34; 273/101.1, 101.2, 142 A, 102.2 B; 250/203, 206, 209; 356/172, 141, 152; 89/41 L; 240/2 F, 6.41; 272/8 P

[56] References Cited

U.S. PATENT DOCUMENTS

| | | | |
|---|---|---|---|
| 2,147,435 | 2/1939 | Gehrcke | 128/187 |
| 3,012,469 | 12/1961 | Clayborne | 250/209 X |
| 3,245,163 | 4/1966 | Allen | 40/34 |
| 3,422,548 | 1/1969 | Waldhauer | 273/101.2 X |
| 3,533,699 | 10/1970 | Hopkins et al. | 356/152 X |
| 3,617,759 | 11/1971 | Martin | 250/227 X |
| 3,709,581 | 1/1973 | McGlasson | 35/12 N X |
| 3,739,176 | 6/1973 | Thorn | 250/203 R |
| 3,891,323 | 6/1975 | Ryan et al. | 89/41 L X |
| 3,904,204 | 9/1975 | Yokoi | 273/101.1 |

Primary Examiner—William H. Grieb
Assistant Examiner—Vance Y. Hum
Attorney, Agent, or Firm—Jacque L. Meister

[57] ABSTRACT

An apparatus for automatically determining without human intervention the intersection point of the axis of an aimable optical system with a plane. A scanning radiation source is imaged on a radiation sensor array by a movable focusing reflector. The signal output from the sensor array is electronically processed to determine the intersection point of the optical axis of the focusing reflector on a target plane. When the apparatus is used as a weapon training simulator, a shot sound synthesizer imparts additional realism.

37 Claims, 17 Drawing Figures

WEAPON TRAINING SIMULATOR

BACKGROUND OF THE INVENTION

This invention relates generally to a weapon training simulator and more particularly to apparatus for sensing the intersection point of a line with a target plane along with associated shot sound simulation systems.

There are many applications where it is necessary or desirable to accurately sense the intersection point of a line and a plane substantially perpendicular to that line. Among such applications are weapon aiming and firing simulators, machinery or tool alignment devices, measuring instruments and surveying instruments. In each of these applications it is essential that the line-plane intersection point be accurately determined. Early systems were primarily optical in nature and involved a human observer sighting through an optical system employing cross hairs or other indicia who specified when the indicia was aligned with a determinable target in the target plane. While such systems have and do suffice for many applications, for many other applications it is desirable to have the alignment system automatic preferably without the normal errors associated with human intervention in the use of optics. Because of the desire for automatic systems and the relatively large number of applications, there have been a number of systems devised to accomplish this.

Among the prior art automatic line-plane intersection determining devices is that of J. Thorn in U.S. Pat. No. 3,739,176 issued June 12, 1973. Thorn's device incorporates plural sensing means to detect relative movement from a predetermined relationship with a laser beam. Each sensing means has two pairs of photoelectric sensors with one pair determining relative movement vertically and the other pair, horizontal movement. Another prior art device is disclosed by N. F. Clayborne in U.S. Pat. No. 3,012,469 issued Dec. 12, 1961, wherein a beam of light does not reach either of two photoelectric sensors when centered between them but does reach one or the other if displaced from the centered position. Yet another prior art device is disclosed by K. Martin in U.S. Pat. No. 3,617,759, issued Nov. 2, 1971. In the Martin device, when a light beam is centered on a four element cross shaped sensor array, comprised of two pairs of sensors, there is no output from the associated electronic system and displacement of the beam from center results in a differential output from one or the other or both pairs to correspond to the displacement.

SUMMARY OF THE INVENTION

A principal object of the invention is to provide a new and improved line-plane intersection detecting device in combination with a radiation source and a means which together define the line and the point of intersection of the line with the plane.

Still another object of the invention is to provide a new and improved scanning radiation source which is long in a horizontal direction and travels in a vertical direction and/or is long in a vertical direction and travels in a horizontal direction. This is achieved by a novel scanning disc with radiation transmitting slits or stripes particularly arranged thereon.

Yet another object of the invention is to provide a new and improved sensor array with its associated circuit which in combination with a focusing reflective optical system, is more sensitive to the accurate location of radiation thereon in the presence of ambient radiation than heretofore practicable. This object is realized by providing a plurality of pairs of radiation sensors arranged to define one or more axes with respect to the radiation source.

The foregoing and other objects of the invention are achieved by a novel optical system which includes a focusing reflector to define a sight line and a scanning radiation source visible to a sensor array through said focusing reflector. The output of the sensor array is indicative of the intersection of the sight line on the target area in the plane. In other embodiments, the radiation source is fixed and the sensor array effects the scan. The nature of the invention and its several features and objects will more readily be apparent from the following description of certain preferred embodiments thereof taken in conjunction with the accompanying drawings although variations and modifications may be effected without departing from the spirit and scope of the novel concepts of the disclosure.

DESCRIPTION OF THE PREFERRED EMBODIMENTS

Figure 1:
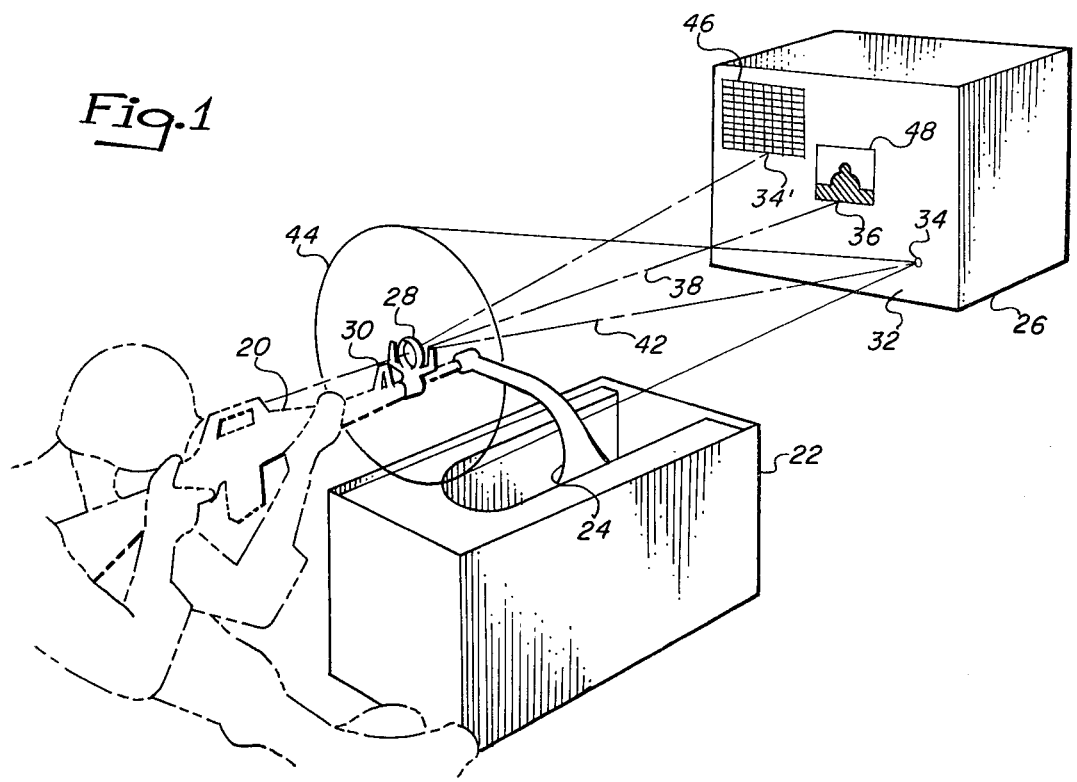
FIG. 1 is a perspective view of a weapon aiming and firing simulator of the invention utilizing a fixed light source and a single rectangular target grid.

FIG. 1 illustrates in perspective form the principal components of weapon aiming and firing simulator embodiment of the invention and in particular the optical relationships present in such a system. As there shown, the simulator is principally comprised of a weapon 20 secured to a base support structure 22 through a support arm 24 and a target assembly 26. Base support structure 22 and support arm 24 are so constructed that the weapon 20 can be held in a comfortable position for aiming at the target by the user while still being capable of the normal position changes incident to sighting by different users.

Mounted on the weapon 20 is a focusing partial reflector 28 which is mounted coaxial with the weapons usual sights 30 and which is boresighted to the weapon. Advantageously reflector 28 is a dichroic mirror whose optimum focal length is ½ the effective optical distance between it and target plane 32 of target 26. In systems heretofore evaluated with focal lengths between ¼ and ¾ of that length, radiation source 34 can be adequately imaged in the target plane. Intersection 36 of optical axis 38 of reflector 28 with plane 32 is at a point halfway between radiation source 34 and radiation source image 34'. Further, this ½ distance relationship remains substantially true independent of any small lateral motion of focusing partial reflector 28 or changes in the distance between reflector 28 and target plane 32. For example, if the angle between the optical axis 38 of reflector 28 and the line 42 between the center of reflector 28 and radiation source 34 is 2°, and it is this or less in preferred embodiments, a lateral motion of reflector 28 which causes its optical axis 38 to intersect the target plane 32 at an angle of 6° from normal, results in an error of only 0.00006 radians between the measured intersection point halfway between source 34 and its image 34' and the optical axis intersection 36. This error is far less than any small arms aiming accuracy.

The arrangement in FIG. 1 comprises a single stationary radiation source 34 and an X-Y mosaic of radiation sensors 46. The active target area sensed 48 is one half the size of the sensor mosaic. This size reduction occurs because the displacement of radiation source image 34' is twice the displacement of the optical axis intersection 36 due to the reflection from reflector 28. The position of radiation source image 34' in the X-Y sensor mosaic 46, is a direct measure of the location of the intersection of the optical axis 36 in the target plane 32 when converted by the 2 to 1 angle factor produced by reflector 28.

If, as illustrated, the reflector optical axis 38 and the weapon sight line are coaxial, target 48 is located midway between the sensor mosaic and the radiation source. In this arrangement, projectile trajectory is introduced by offsetting target 48 up or down from the exact midposition depending on the range to the target that is being simulated. This movement of the target up or down places it above or below the midpoint between radiation source 28 and mosaic 46 and requires aiming point or weapon sight adjustments to compensate for the apparent range change.

To enhance realism to the user, reflector 28 is advantageously constructed with its front and rear surfaces of the same radius and parallel to each other. This arrangement permits the reflector to have optical power while having zero power to the user. Further, radiation source 34 must be projected over a cone whose base 44 is large enough in diameter in the sighting area to permit the weapon 20 (and reflector 28) a full range of movement to cover any desired combination of target location and user need in sighting at same.

To eliminate the disturbing effect of a bright visible light in the target area while using a high efficiency coaxial sighting and reflecting system, advantageously an infra-red sensing system is used. In using such a sensing system radiation source 34 can be an incandescent light with an IR filter or an IR source such as an LED or laser. With a corresponding selective IR reflective coating on reflector 28 and IR sensitive detectors in sensor mosaic 46, more than 80% of the visible light can pass through the reflector and more than 80% of the usable IR energy can be reflected back and focused at the detectors. This arrangement makes radiation source 34 invisible or nearly so to the user. The same type of technique could be used in ultra-violet or any other non-visible range of the electro-magnetic spectrum for which suitable sources, coatings and sensors are available. Similarly, ultra-sonic radiation can be employed.

Figure 2:
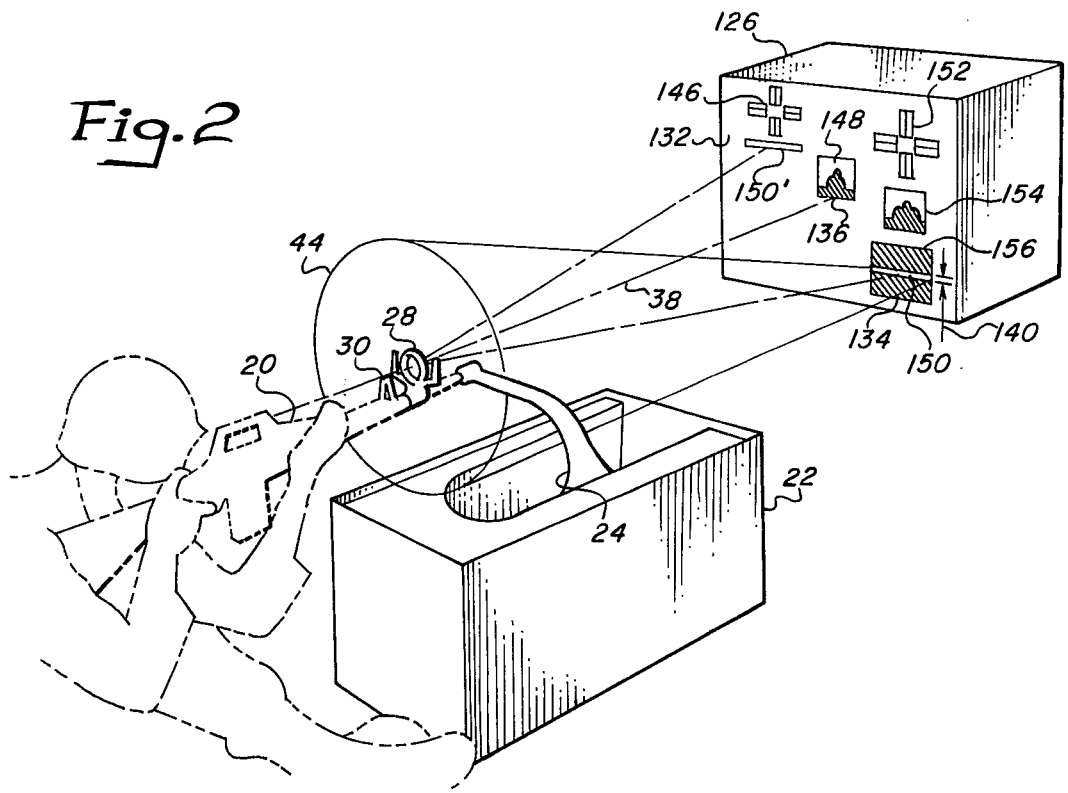
FIG. 2 is similar to FIG. 1 but incorporates plural targets, the preferred photosensor array and a novel scanning irradiated slit assembly.

FIG. 2 illustrates another embodiment of a weapon aiming and firing simulator using identical optical relationships but incorporating plural targets and a novel scanning irradiated slit assembly 134. Slit assembly 134 is located in the target plane 132 and is a component of target assembly 126. Scanning irradiated slit assembly 134 provides repetitive moving strips of radiant energy 150 which are alternately long in a horizontal axis as shown, and which travel in a vertical direction and then, sequentially, a strip that is long in a vertical axis and which travels in a horizontal direction. As in the embodiment of FIG. 1, all points in the moving strip of radiation 150, must, of course, be projected over a cone whose base 44 is large enough in the sighting area to cover the entire necessary or desirable travel of the weapon 20 with its associated reflector 28.

Selective focusing reflector 28, then focuses moving strip of radiation 150 back in target plane 132, where sensor array 146, senses the travel of the imaged strip 150' across the sensor array 146. Signals from sensor array 146, can provide an electrical pulse each time alternate vertical and horizontal imaged strips of radiation 150' cross the center of sensor array 146. An electrical positional reference synchronized with the traveling strips of radiation provides the data required to convert the pulses generated as the imaged strips cross the center of array 146, to relative reflector aiming position in each axis. These position measurements can be either analog or digital in form; the use to be made of the signals, whether there is to be an immediate display or storage, etc., dictates the form of the data.

FIG. 2 illustrates one method of providing multiple targets. In FIG. 2 there is provided two radiation sensor arrays 146 and 152 corresponding to active target areas 148 and 154, respectively. Alternately (and not shown) it is possible to achieve the effect of multiple targets with duplicate radiation sources. In either event, multiple targets can be readily boresighted with range trajectory offset included and data from all targets displayed on a single target display. With more than one target, sequential display of shot information is desirable. By proper sequencing of radiation or of sensor data, depending on the data handling system used, the aiming position data at each target can be separately detected and displayed.

In FIG. 2, the vertically moving strip of radiation 150 is shown at the center position of slit assembly 134 and this strip is imaged at 150' just below sensor array 146. Sensor array 146 is the array for active target area 148, which is shown as a silhouette target. The image 150' is just below array 146 because focusing partial reflector 28 and with it weapon 20, is aimed just below target 148 at 136.

The strip of radiation 150 is shown traveling vertically from the top to the bottom of back irradiated aperture 156. Sequentially, thereafter, a vertical strip of radiation (not shown in FIG. 2) appears at the right edge of aperture 156 and travels horizontally to the left edge. If the weapon 20 and reflector 28 are aimed at active target area 148, then at one point in each radiation strip traverse of aperture 156, the image of the strip will cross the middle of sensor array 146, respectively vertically and horizontally. The time sequence of the crossing can then be used to electronically determine the orthogonal coordinates of intersection 136 within target area 148.

The sequentially moving alternately vertical and horizontal strips of radiation can be generated in a number of fashions such as by rotating mirrors, electronic scans, LED array scanning, laser scanning, mechanical scanning discs, moving belt scan, etc. Presently preferred because of its simplicity and reliability is the scanning disc design shown in FIG. 6.

Figure 6:
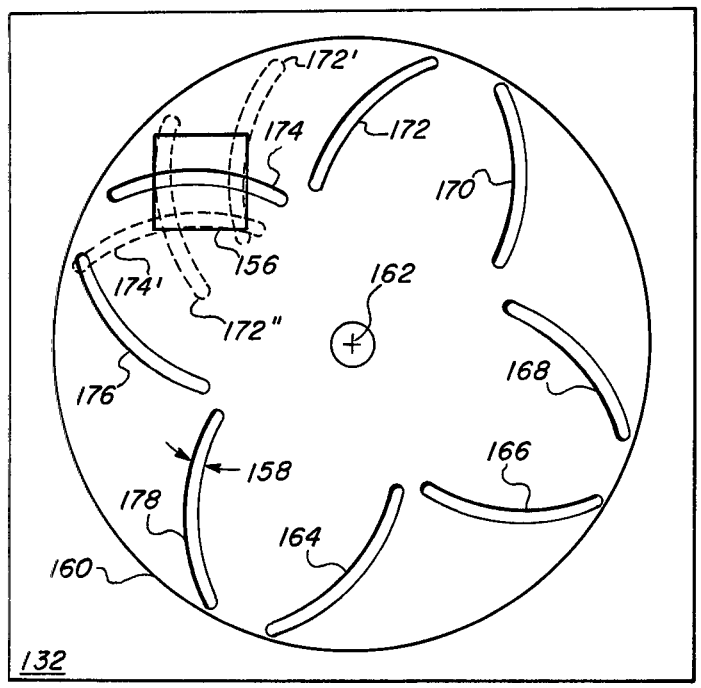
FIG. 6 is a view partly in schematic form illustrating the manner of achieving vertical and horizontal scans by a scanning slit.

In FIG. 6, an opaque disc 160 rotates about axis 162 moving a series of 8 clear slits 164 – 178, in sequence, past aperture 156 shown for reference purposes. Aperture 156 corresponds to back illuminated aperture 156 in FIG. 2 and is incorporated in an opaque panel corresponding to target plane 132 of the same figure. Counterclockwise rotation of disc 160 moves slit 174 down to position 174' near the bottom of aperture 156. Then a slight additional counterclockwise rotation moves horizontal slit 174 below aperture 156 and causes vertical slit 172 to begin its right to left traverse of the aperture as shown sequentially at 172' and 172". Additional rotation then causes horizontal slit 170 to appear at the top of the aperture and move down. This action continuing for each of the slits 146–178 moving across aperture 156 results in sequential scans of a horizontal slit traveling vertically and a vertical slit traveling horizontally. With a suitable radiation source appropriately positioned, these alternating vertical and horizontal slit traverses are converted to alternating scanning traverses of radiation strips which are directed at reflector 28 on weapon 20.

Figure 11:
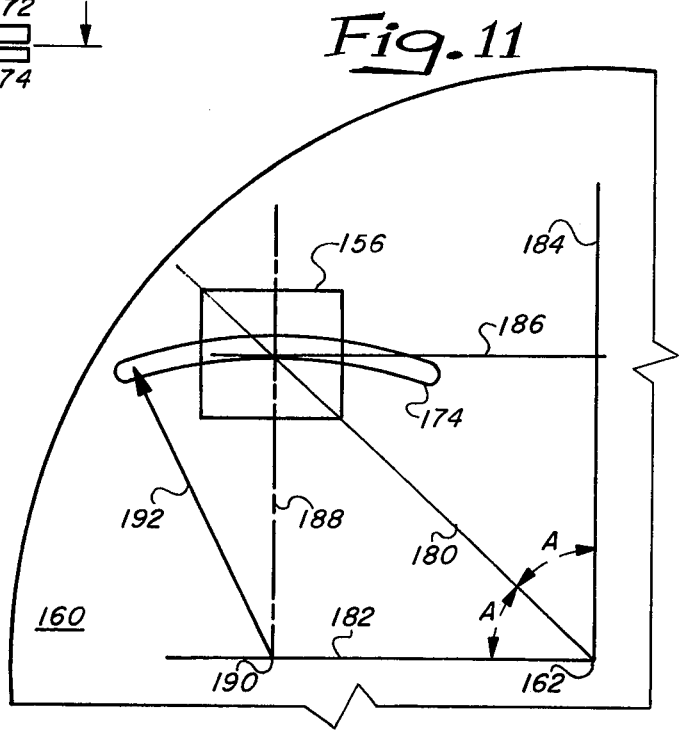
FIG. 11 shows the geometry of the scanning discs illustrated in FIGS. 5, 6 and 8.

The geometry of scanning disc 160, is shown in expanded scale in FIG. 11. Construction axis 180 passes through the center of rotation 162 of disc 160 and through the center of aperture 156. Angles "A" are 45 degrees and define the location of horizontal construction axis 182 and vertical construction axis 184 both of which pass through rotation center 162. Horizontal construction axis 186 and vertical construction axis 188 pass through the center of aperture 156 intersecting each other and axis 180 at that point. The center of curvature 190 of slit 174 with radius 192 is located at the nominal intersection of axes 182 and 188 when slit 174 is centered in aperture 156 as shown.

As shown, aperture 156 has dimensions that are a large fraction of the diameter of disc 160. With such dimensions, slight modifications can be made in the above described slit radius and center of curvature determination to provide a better nominally horizontal slit as slit 174 traverses aperture 156 from top to bottom and to improve the linearity of travel of the slit across aperture 156. However, in all cases heretofore evaluated, radius 192 is within 25% of the dimension between axis 182 and 186 and slit curvature center 190 lies no further than 25% of the distance between axis 182 and 186 from the intersection of axes 182 and 188 to produce the best combination of travel linearity and average horizontal slit opening over the entire travel of slit 174 across aperture 156. The geometry of each of the other horizontal slits 170, 166 and 178 are determined in an identical fashion to slit 174.

The manner of determining the geometry of each of the vertical slits 164, 168, 172 and 176 is a mirror image to the horizontal slits geometry about axis 180 with the center of slit curvature located at or near the intersection of axis 184 and 186.

Obviously, from a consideration of the aforedescribed geometry, when aperture 156" is large compared to the diameter of the scanning disc 160, fewer scanning slits can be located in the disc and, when aperture 156" is small compared to disc diameter, more scanning slits can be located in the disc. The actual determination of the proportions between aperture 156 and disc 160 depends on the particular circumstances. More slits increase the data rate available to determine aiming point but at the expense of increased complexity. In one presently preferred embodiment, aperture 156 is one inch square, disc 160 is eight inches in diameter and incorporates 4 vertical and 4 horizontal scanning slits.

As described above in connection with FIG. 2, a pulse is generated when the image 150' of radiation strip 150 crosses the center of sensor array 146. Sensor array 146 is shown in an enlarged view FIG. 4. As shown, it is comprised of eight photo-sensors 194–208 which, in the presently preferred embodiment, are silicon photodiodes arranged as shown. The electrical connection of diodes 194–208 is shown in FIG. 5.

As strip 150 moves down across aperture 156, its image 150' moves upward across sensor array 146, assuming aim of weapon 20 and mirror 28 within target area 148, and circuit 210 generates a vertical center crossing pulse. As the horizontal strip image moves upward across sensor diodes 196 and 200 which are connected in parallel, a negative voltage is applied to the input of operational amplifier 212. This causes the output of amplifier 212 to go in a positive direction. When the output of amplifier 212 exceeds approximately 1.6 volts, the output of Schmitt Trigger Nand Gate 214 goes to binary 0 if its second input is binary 1 from Q of bi-stable flip-flop 216. As slit image 150' continues its upward travel across sensor array 146, it begins to irradiate sensor diodes 194 and 198 which are connected in parallel opposition to diodes 196 and 200. This causes an increasing positive-going voltage to be applied to amplifier 212 whose output responds by returning toward 0 volts. Assuming equal sensitivity of diodes 194–200, the output of amplifier 212 will be zero when the slit image is exactly centered on sensor array 146. As the output of amplifier 212 falls toward zero volts, gate 214 will trip to binary 1 at a point when amplifier 212 output is approximately 0.8 volts assuming the second input continues as 1 from Q of flip-flop 216.

Advantageously the gain of amplifier 212 is maintained high by using a large value for feedback resistor 218. This keeps the output of amplifier 212 above the 0.8 volt trip point of gate 214 until the output current of sensor diodes 194 and 198 is substantially equal to the output current of sensor diodes 196 and 200. Because of the high gain of amplifier 212, small changes in the trip point voltage of gate 214 have negligible affect between the relationship of the trip point to the point where there are equal current outputs from each sensor pair and hence on the center crossing pulse accuracy. The combination of amplifier 212 and Schmitt trigger 214 acts as a precision null detector to determine the point of equal current outputs from each sensor pair. This in turn assures good accuracy in the trip point of gate 214 as the strip image 150' crosses the center of sensor array 146. Diode 220 keeps amplifier 212 from going more than approximately 0.7 volts negative which could damage gate 214. From the foregoing it can be seen that best accuracy in sensing the center crossing of strip image 150', is obtained when the image of the slit width is much narrower than the combined width of a sensor pair 194–196 or 198–200. However, good accuracy can be obtained with a defocused image width several times the combined width. Also, it is desirable to have the overall height and width of the sensor array larger than 10% of the length of strip image 150's length to provide high signal level and average any irregularities in the radiation source, travelling slits, or optical elements.

Sensor diodes 202–208, operational amplifier 224, resistor 226, diode 228 and the Nand Gate 230 in circuit 222 generate a horizontal center crossing pulse when a vertical strip image passes the center of diodes 202–208 in the same manner as described for circuit 210 and its vertical center crossing pulse.

The inputs to Nand Gates 214 and 230 from Q and Q of flip-flop 216, hold these gates alternately in the zero position when a strip image from the opposite axis is crossing the sensor array. This action prevents false signals from the inactive half of the sensor array such as could be caused by unbalanced sensor diodes in the inactive half.

The outputs from Gates 214 and 230 are summed in And Gate 232. This provides a common data channel at the output of Gate 232 which trips to 1 each time a horizontal or vertical slit image crosses the center of the corresponding sensor array. When Gate, 232, trips to 1, One shot Multivibrator, 234, generates a short pulse, on the order of ½ microsecond, to store the digital position data from interface, 236 at the output of latch, 238. Flip-flop 216 and Interface 236, receive their position generated signals from position detector 240 which is phased to scanning disc 160. Position detector 240 is shown schematically as an encoder mechanically coupled to scanning disc 160. However, any means for generating position data in phase with scanning disc 160, can be used.

The alternate X and Y position data at the output of latch 238, is stored in "Y" position memory 242 and "X" position memory 244. Display and storage control 246 properly channels the data from Memories 242 and 244 to Data Display 248, which, in a preferred embodiment is a TV monitor. Display and storage control 246 is stepped when the user pulls the trigger to initiate firing of weapon 20. The stepping of control 246 allows new "X" and "Y" data to be stored in memories 242 and 244 and releases stored data to display 248.

An important feature of the invention is the ability to continuously display the inersection 136 of optical axis 38 on an oscilloscope or T.V. monitor. With the target superimposed on the same display, the actual weapon aim is displayed on a real time basis. This allows an instructor to observe target acquisition, breathing effects, trigger jerk, flinching and improper lead on moving targets directly on a real time basis as the trainee is aiming and firing the training weapon.

Several seconds or even minutes of the changing intersection position prior to and immediately after firing the weapon can be stored on a real time basis for subsequent playback. The trainee or instructor can then study the characteristics of a particular shot. This can be accomplished in FIG. 5 by dedicating a section of "X" and "Y" position memories 242 and 244 to transient data storage and by generating sequential transient address, storage, and readout commands in Display control 246. Transient data is then stored continuously until the training weapon is fired. The length of time stored is a function only of the number of storage positions dedicated to transient storage and the time interval between positions. A typical arrangement would have 64 positions stored and 1/10 second between positions. This would give a 6.4 second transient storage time and the data for that storage time could then be displayed as it occurred, on data display 248.

As noted above, the proportions between the size of aperture 156 and the size and number of scanning slits depends on the use to which the line-plane intersection device is to be put. Also, as the aperture increases in size relative to disc diameter, the scanning slits become increasingly less accurate approximations to straight horizontal and vertical lines.

Because of the need of fully irradiating the sensor array at all aiming positions on the active target area and the angle doubling effect of reflector 28, the usable target dimensions are limited to slightly less than ½ the dimensions of slit aperture 156, if a single sensor array 146 is used. However, the usable target dimensions can be doubled, tripled, etc. by using expanded sensor arrays as follows.

Figure 7:
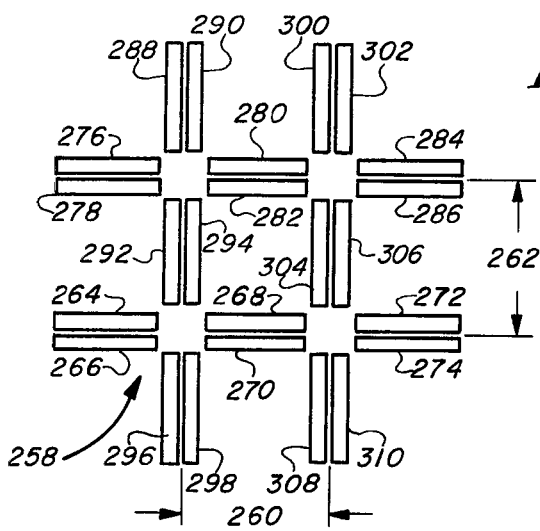
FIG. 7 illustrates a sensor array for doubling the usable target dimensions.

A sensor array 258 for doubling the usable target dimensions is shown in FIG. 7. Dimensions 260 and 262 are made slightly smaller than the horizontal and vertical dimensions of aperture 156. Maximum size of 260 and 262 should be aperture 156 height or width dimensions minus traveling slit width 158, in FIG. 6 or 140 in FIG. 2. As shown, sensor array 258 is comprised of 12 pairs of photo-diodes or 24 in all identified as 264–310 in the drawing. The electrical connection of these diodes and the manner of using their output data are described in connection with FIG. 8.

Figure 8:
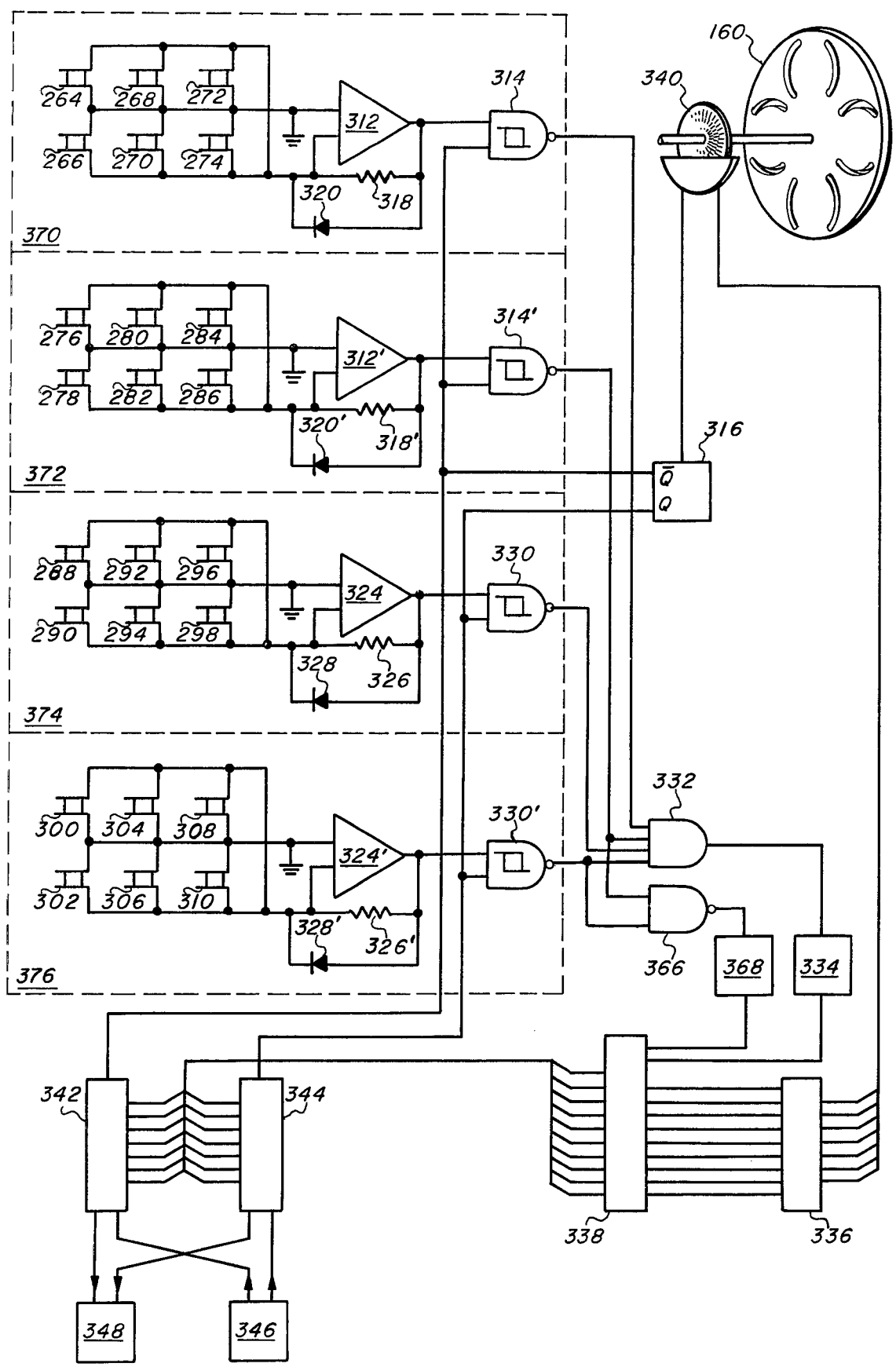
FIG. 8 is a circuit diagram in block diagram form illustrating the preferred circuitry for use with the sensor array of FIG. 7.

The operation of the expanded sensor array circuitry of FIG. 8 is identical to the operation of the circuitry of FIG. 5 with one additional function. Circuit 370 generates a vertical center crossing pulse at the output of Nand Gate 314 each time a vertically traveling horizontal strip image crosses the center of cells 264–274 in the same manner as Circuit 210 in FIG. 5. Similarly circuit 374 generates a horizontal center crossing pulse at the output of Nand Gate 330 each times a horizontally traveling vertical strip image crosses the center of cells 288–298 in the same manner as circuit 222 in FIG. 5. These pulses from circuits 370 and 374 activate And Gate 332 just as the pulses from circuits 210 and 222 activated Gate 232. Operation of bi-stable flip-flop 316 and circuit elements 334–348 is the same as in FIG. 6 when circuits 52 and 54 are generating pulses. The circuit elements of circuits 370 and 374 are identical to those of circuits 210 and 222 of FIG. 5 and function in an identical manner and have been given identical reference numerals plus 100. Similarly, circuits 372 and 376 are identical to circuits 370 and 374, respectively. To indicate this identity, the circuit elements of circuits 372 and 376 have been given reference numerals the same as circuits 370 and 374 but with a prime (') designation added.

Circuit 372 generates a vertical center crossing pulse at the output of Nand Gate 314' each time a vertically traveling horizontal slit image crosses the center of cells 276–286 just as circuit 370 does. Circuit 376 generates a center crossing pulse at the output of Nand Gate 330' each time a horizontally traveling vertical image crosses the center of cells 300–310 just as circuit 374 does. If circuit 370 is generating a center crossing pulse at a given position detector position, circuit 372 will generate a center crossing pulse at the same position detector position when the reflector optical axis intersection 136 in FIG. 2 is moved up one half of dimension 262 in FIG. 7. This means the entire traveling slit image has been moved up a distance 262. For circuit simplification the position detector 340 generates $2^n$ least significant bits as the slit image travels the same distance 262. As an example there could be 16 or 32 least significant bits generated by position detector 340 as the slit image travels the distance 262. This allows an accurate expansion of the sensing area by simply adding $2^n$ to the position detector output when the center crossing pulse is generated in circuit 372 instead of circuit 370.

Nand Gate 366 and Delay Gate 368 accomplish the adding of $2^n$ to the position detector output whenever Circuit 372 or 376 are generating center crossing pulses as follows. If circuit 372 or 376 are generating center crossing pulses, Nand Gate 366 is at 1 just prior to the latch pulse generated by one shot multivibrator 334. This puts the output of Delay Gate 368 at 1. The output of Delay Gate 368 is connected to the $2^n$ input of latch 338. Nand Gate 366 switches back to 0 when the crossing pulse and latch pulse out of one shot multivibrator 334 occur, but the delay in Gate 368 holds the 1 at the $2^n$ input of latch 338 until the latching is completed. Thus anytime circuit 372 or 376 are generating center crossing pulses, the position indicated from the position detector at the instant of the center crossing pulse is shifted in latch 338 by $2^n$ bits. This doubles the total bit capacity in "X" and "Y" out of latch 338 to correspond to the doubling of the dimensions over which the strip image 150' can be sensed. Obviously, just as the sensor array of FIG. 7 and its corresponding circuitry in FIG. 8 doubled the usable target dimensions, the addition of further sensors and circuit elements can be used to extend the sensing area still further to any desired size.

Figure 4:
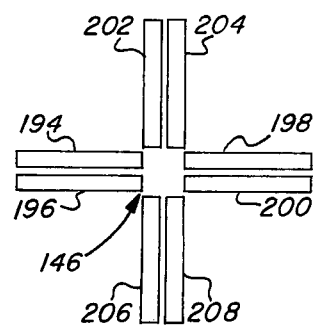
FIG. 4 is an enlarged view of the sensor array of FIG. 2.
Figure 5:
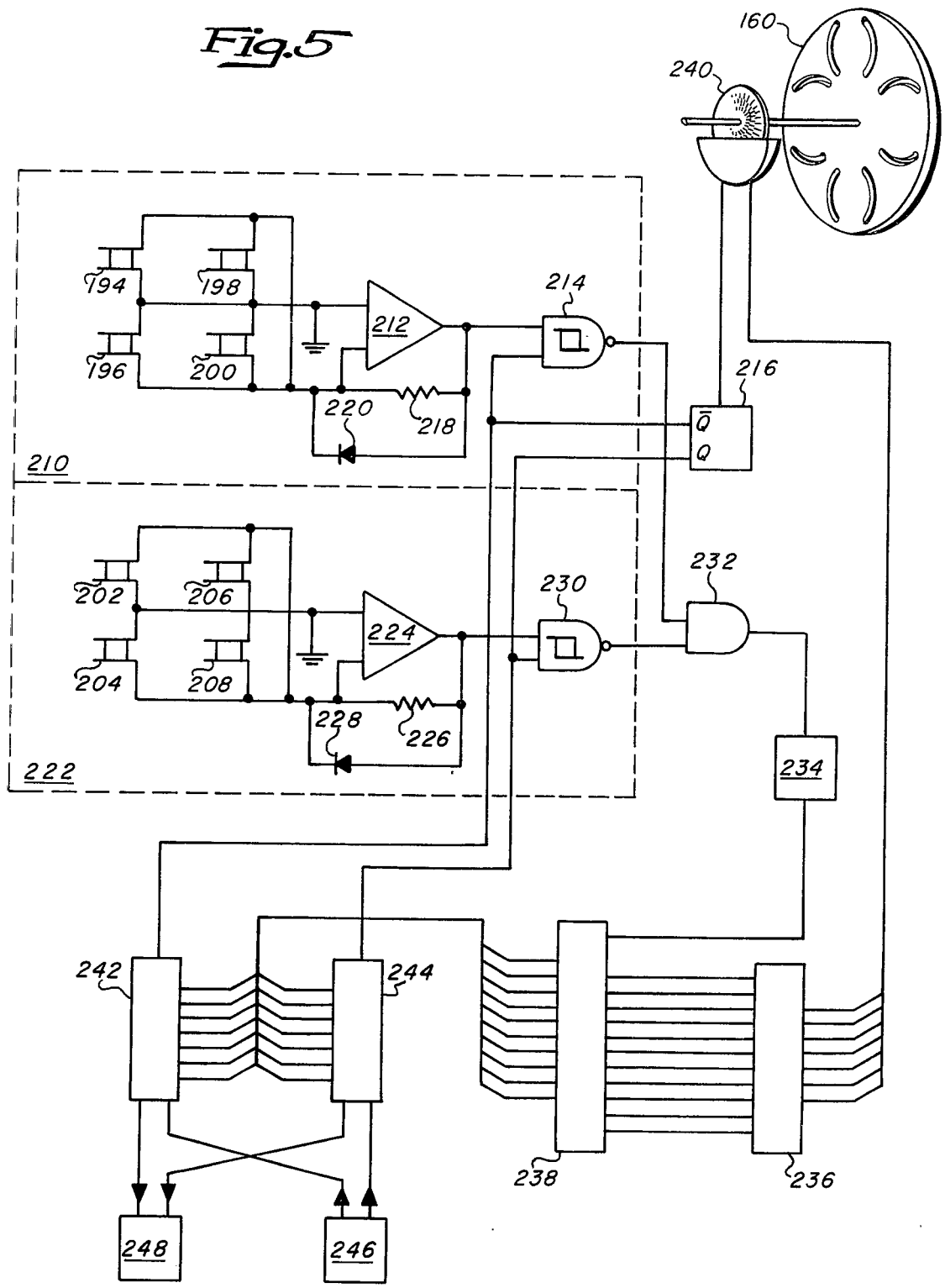
FIG. 5 is a circuit diagram in block diagram form illustrating the preferred circuitry for use with the sensor array of FIGS. 2 and 4.

One of the important features of the invention is the use of sensor arrays such as shown in FIG. 4 and FIG. 7. Such sensor arrays inherently reject ambient radiation because of their use of cell pairs connected in parallel opposition. If the "cell" pairs are balanced, any ordinary irradiation incident on the array will be cancelled and generate no electrical signal. Only incident radiation which has a gradient across the sensor array can produce an electrical signal.

Figure 3:
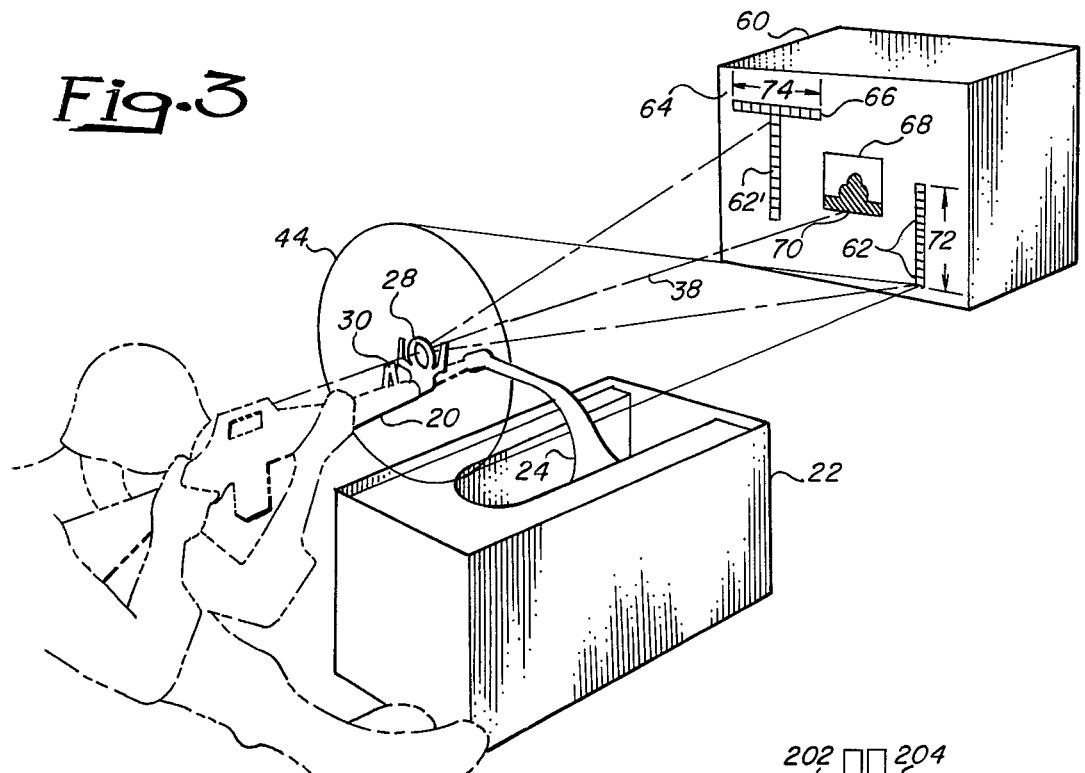
FIG. 3 is similar to FIG. 1 but incorporates a spot radiation source scanning in one axis and a target array comprising a multiplcity of photosensors arranged to be electrically scanned in the opposite axis.
Figure 9:
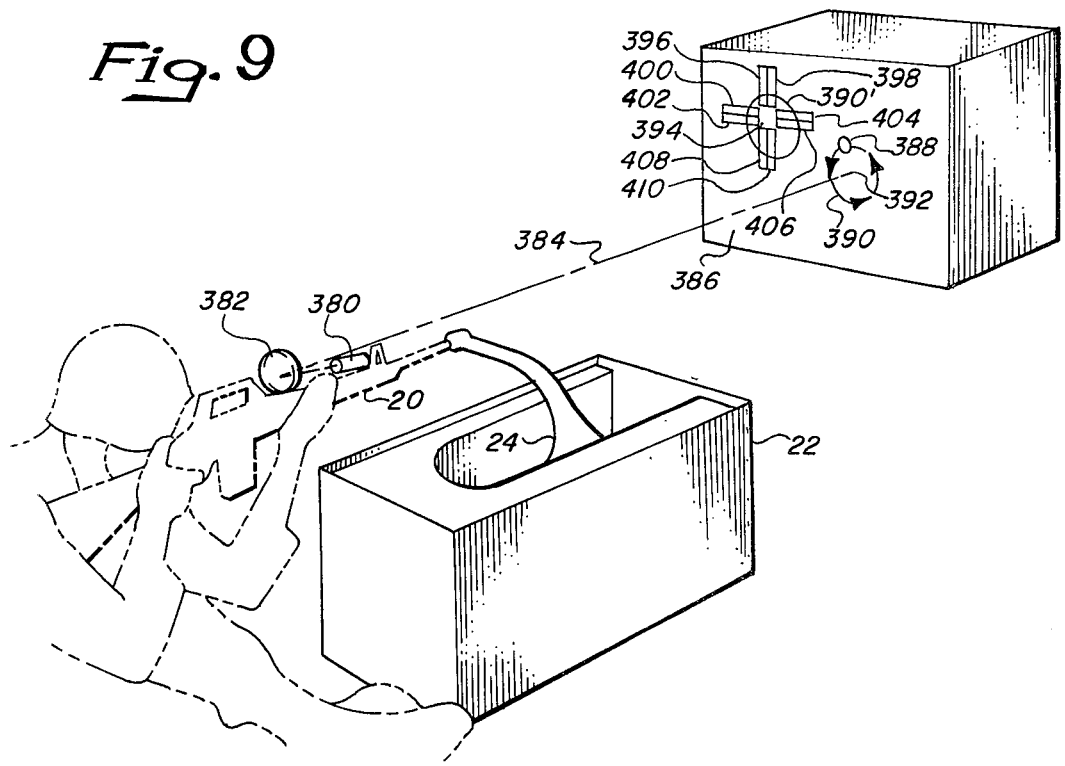
FIG. 9 illustrates another embodiment of the weapon aiming and firing simulator of the invention with the light source mounted to enhance ambient radiation rejection.
Figure 10:
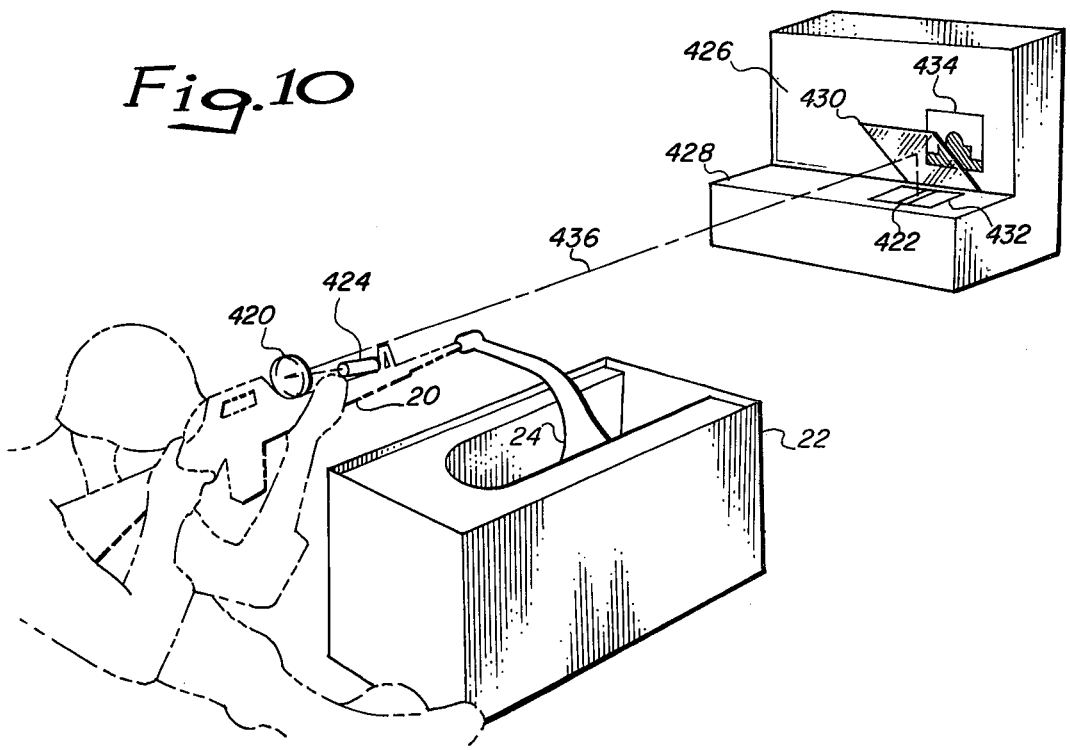
FIG. 10 illustrates another embodiment of the invention with modified optical paths to eliminate the optical path angle doubling of FIGS. 1, 2, and 3.

FIGS. 3 and 9–10 illustrates still other embodiments of the weapon aiming and firing simulator of the invention. The FIG. 3 embodiment uses identical optical relationships to those shown and described in connection with FIGS. 1 and 2 but utilizes a different radiation source and target array. Target assembly 60 comprises a radiation source 62 located in the target plane 64. Radiation source 62 provides a spot source of radiation scanning in one axis which source is imaged at 62' by reflector 28. Also located in the target plane is a linear array of multiple sensors 66. Positioned half way between the center of sensor array 66 and source 62 is active target area 68 shown as a silhouette target. Active target area 68 is equal to ½ the length 72 of radiant spot scan by ½ the length 74 of multiple sensor array 66.

The position of weapon 20 aim is the position of the intersection 70 of axis 39 with target plane 64 and is determined by the combination of the position of radiation source 62 and the sensor in array 66 which produces the largest signal from the reflected image. By using sensor pairs in array 66, ambient illumination is rejected and by comparing the output signal amplitude of adjacent sensors or sensor pairs, the resolution of weapon aim can be made several times smaller than ½ the spacing of sensors in the linear array. In FIG. 3, radiation source 62 is imaged at 62' just below sensor array 66 because the aiming point 70 of weapon 20 and reflector 28 is just below target 68. If the weapon 20 was reaimed to be within active target area 66, then the intersection point of image 62' of source 62 on array 66 would provide the "X" coordinate of aim and the "Y" coordinate would be a function of the time of intersection as related to the position of the traveling spot, or in the case of sensor pairs, the time of center crossing. If the time of intersection is ½ that of the scan duration, aim is centered vertically on the target. The aim information can be either analog or digital depending on its use. The vertical spot scan can be achieved by any of a number of scanning devices such as a disc with a slotted spiral, a TV scan, etc.

FIG. 9 illustrates another embodiment of the invention. In FIG. 9, the radiation source is mounted on weapon 20. The radiation source 380, shown in FIG. 9 projects a rotating or nutating spot of radiation toward selective wave length focusing reflector 382. Reflector 382 focuses the nutating spot symmetrically about projection axis 384 in target plane 386. The spot as shown at 388 represents one position of the focused spot of radiation which rotates or nutates in circle 390. The diameter of circle 390 is determined by the rotation or nutation amplitude of the radiation spot in source 380, the distance between focusing reflector 382 and the nutating spot in 380 and the distance between reflector 382 and target plane 386. Source 380 is angled with respect to projection axis 384, and focusing reflector 382 axis is set at ½ that angle, producing the final projection axis 384. Projection axis 384 is boresighted with weapon 20.

When weapon 20 is reaimed so nutating spot 388 moves over sensor array 394 in a circle such as 390', data is generated in each sensor pair 396 and 398, 400 and 402, 404 and 406 and 408 and 410. A center crossing pulse is generated in each of these cell pairs just as in the sensor embodiment shown at 146 in FIG. 2. A comparison of the times between center crossings of each sensor pair gives the intersection 392, of projection axis 384, with target plane 386. At any position of 392, where center crossing signals are generated in all four sensor pairs, the position 392 can be determined from the center crossing time differences. In this embodiment there is a one-to-one angular relationship between indicated position and aiming position.

Another embodiment of the weapon aiming and firing simulator is shown in FIG. 10. Focusing reflector 420 focuses the image of scanning illuminated strip 422 on a detector assembly in detector housing 424. The detectors are arranged within the housing, as in FIG. 4, with array size matched to the image of traveling strip 422. In matching the size, the width of a detector pair such as 202 and 204 in FIG. 4 is normally made equal to or larger than the width of the traveling strip image in the plane of the sensor array.

Target plane 426, traveling strip plane 428 and partially reflecting plane reflector 430 are placed relative to each other to provide optical coincidence between target plane 426 and traveling strip plane 428. This is accomplished by having the partially reflecting surface of plane reflector 430 bisect the angle between target plane 426 and traveling strip plane 428.

The operation of the FIG. 10 embodiment of the invention is as follows. Infra-red illumination from scanning strip 422 is reflected toward selective focusing reflector 420 by partial reflector 430. Aperture 432 appears optically to be coincident with target 434. Illumination from target 434 travels directly to the eye of the man aiming the weapon through partial plane reflector 430, and dichroic focusing reflector 420. The reflected scanning strip 422 is alternately a vertical line moving horizontally, then a horizontal line moving vertically in a fashion similar to that of strip 150 in FIG. 2. The sensor array in housing 424 generates center crossing pulses which are correlated with the position of scanning strip 422 to determine the intersection point of optical axis 436 on target plane 426.

Circuitry identical to that of FIG. 5 accomplishes the detection of center crossings and intersection point storage and display. The basic difference in operation from all of the previously described embodiments, except that of FIG. 9, is the one to one angular relationship in this embodiment.

Figure 12:
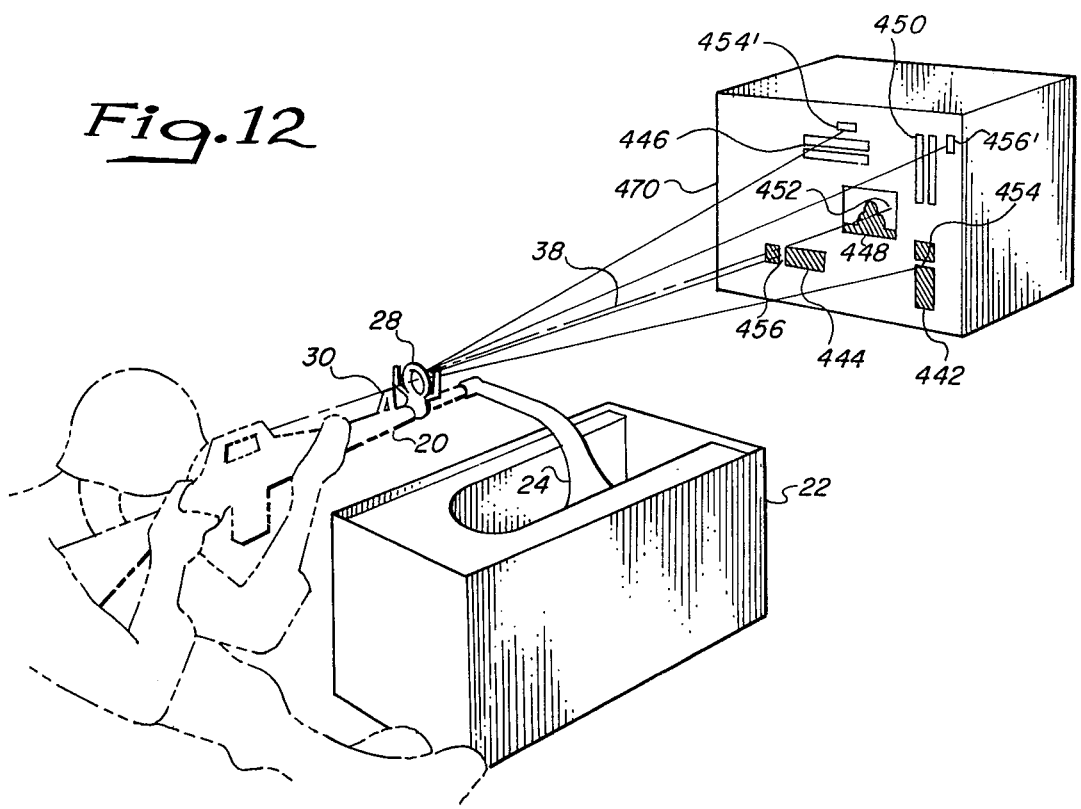
FIG. 12 shows another sensor-scanning slit arrangement with improved data rate and a simplified scanning disc.

Another embodiment of the invention using traveling strips of radiation to determine the intersection point of a line and a plane, is illustrated in FIG. 12. Here, two scanning strips of radiation originate from different positions in the target plane 470. Back irradiated aperture 442 defines the limits or a horizontal strip of radiation which travels vertically. Aperture 444 defines the limits of a vertical strip of radiation which travels horizontally. Detector pair 446 and aperture 442 are located symmetrically about target 448. Detector pair 450 and aperture 444 are also located symmetrically about target 448. When line of sight 38 intersects target 448 at 452 as shown, the reflected image 454' of radiation strip 454 will cross the center of cell pair 446 when strip 454 is near the top of aperture 442. The length of aperture 442 must be slightly more than twice the height of active target area 448 and the length of sensor pair 446 must be approximately twice the width of active target area 448. This will insure data generation any time the intersection of line of sight 38 with the target plane falls inside the limits of target 448. The signals generated by sensor pair 446 are processed as in circuit 210 of FIG. 5 to generate vertical center crossing data. The signals generated by sensor pair 450 are processed as in circuit 222 of FIG. 5 to generate horizontal center crossing data.

With the conditions shown in FIG. 12 the image 454' of radiation strip 454 is formed by focusing reflector 28 as shown. Also the image 456' of radiation strip 456 is formed by focusing reflector 28 as shown.

There are certain advantages in separating the vertical traveling radiation strip from the horizontal traveling radiation strip. First, horizontal aiming position data and vertical aiming position data can be generated simultaneously, giving a higher data rate. Second, longer travel of the radiation strip can be achieved with a given diameter scanning disc while maintaining good strip direction and travel uniformity.

Figure 13:
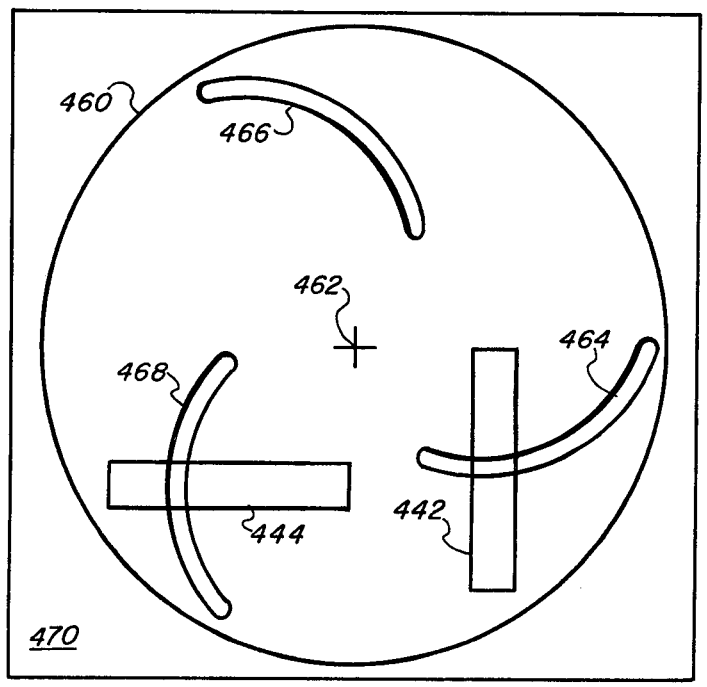
FIG. 13 illustrates in detail the scanning disc employed with the FIG. 12 embodiment.

A mechanical scanning disc which provides both the vertical traveling and horizontal traveling radiation strips required by the FIG. 12 embodiment is shown in FIG. 13. Opaque disc 460 rotates on axis 462 and moves slits 464, 466 and 468 which are clear areas on opaque disc 460 past rectangular apertures 442 and 444 in opaque plate 470. Rectangular apertures 442 and 444 are the back irradiated apertures 442 and 444 in FIG. 12 and plate 470 is the target plate of that figure. The action of each slit as it moves past aperture 442 or 444 produces a radiation strip across the narrow direction of the aperture which travels from one end to the other of the aperture. The traveling strip of radiation in each aperture moves in only one direction as opposed to the arrangement of FIG. 6. The requirements for the slit geometry in scanning disc 460 are similar to the requirements for the slit geometry of scanning disc 160 in FIG. 11 except the centers of apertures 442 and 444 are usually not at a 45 degree angle. Scanning disc 460 in FIG. 13 of course has all slits curved in the same direction instead of alternating curvature as on disc 160.

Figure 14:
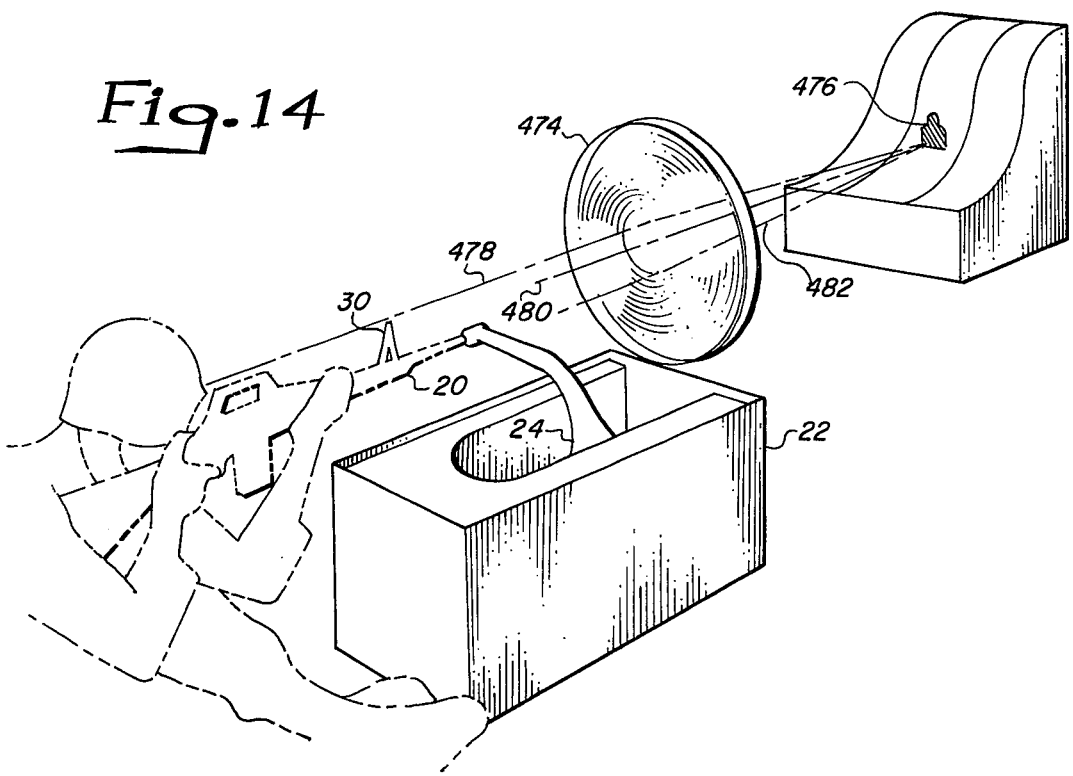
FIG. 14 is a view of a weapon aiming and firing simulator with an optical system that gives the appearance of targets at long range.

An embodiment of the weapon aiming and firing simulator which introduces the appearance of a very long distance between the weapon and target, is shown in FIG. 14. Lens 474 is interposed between the weapon 20 and target 476 so the person using weapon 20 sees target 476 through lens 474. The focal length of lens 474 is equal to or slightly greater than the distance between lens 474 and target 476. This causes target 476 to appear to be at a long range since the direction to the target remains constant as the weapon 20 is moved up and down or sideways. This is shown in FIG. 14 by sight line 478 and alternate sight lines 480 and 482. Line 480 is on the optical axis of lens 474 and thus is not deviated when it passes through lens 474. Line 478 is above the optical axis and thus is deviated down by lens 474. Line 482 is below the optical axis and is thus deviated up by lens 474. With the focal length of lens 474 equal to the distance to target 476, lines 478, 480 and 482 are all parallel on the weapon side of lens 474 as shown. Thus, as the training weapon is moved up, down or sideways the direction of the sight line to target 476 remains the same just as it would in aiming at a true distant target. If target 476 is moved slightly inside the focal length of lens 474, this has the same final effect on the sight line as moving a true target closer. For example, if lens 474 has a focal length of 60 inches, placing target 476 at 59 inches from the lens is the equivalent of a true target positoned at 300 feet. Placing target 476 at 58 inches from lens 474 is the equivalent of a true target positioned at 146 feet. Placing target 476 at 56 inches from 60 in focal length lens 474 is the equivalent of a true target positioned at 71 feet.

The result of this large apparent target range difference in such a small distance in the simulated target area allows great realism to be introduced in a weapon firing simulator by combining small changes in target placement with large changes in target size.

As an example a target size scaled to appear the size of a real target at 100 yards could be placed at a 59 inch distance, a target twice that large placed at a 58 inch distance and a target 4 times as large placed at 56 inches and with proper treatment of artificial terrain in the simulated target area a very realistic simulation of identical targets at 100 yards, 50 yards and 25 yards is obtained. With this arrangement as the person holding the training weapon moves his head from side to side or up and down the movement of simulated targets relative to each other is very realistic both qualitatively and quantitatively.

In most cases the image quality obtained with a simple convex lens for lens 474 is very acceptable. However, the dispersion of a non-color corrected simple lens creates errors in the measured aiming intersection when IR is used for sensor irradiation. This error is produced because the focal length in the IR is longer than the focal length in the visible. The person aiming the rifle uses visible light for aiming through lens 474 but the IR radiation passing through lens 474 to the sensor array is refracted less than the visible because of the lower index in the IR. This error can be readily corrected by moving the target a short distance toward the weapon so it is located closer than the plane of the line-plane intersection detecting system. In a typical system with a 60 inch focal length simple lens, moving the target approximately 1 inch closer than the detection plane corrects for the dispersion.

In any of the inventive systems with the radiation source and the detectors in the target area it is not necessary that the radiation source and sensor array be in the same plane. If it is desirable for mechanical or illusion purposes to have one in a plane behind the target and the other plane in front of the target this has negligible effect on accuracy so long as one-half the sum of the distance from the focusing reflector to the radiation source and the detector array is properly matched to the distance to the target, i.e., with a 60 inch focal length simple lens and a target at 59 inches the sum of the distance from the radiation source to the lens and from the sensor array to the lens, divided by 2 should be 60 inches whereas without the lens the sum of these distances divided by 2 should be equal to the distance to the target for both the sensor array and radiation source.

In the embodiment shown in FIG. 14, the sensor array, radiation source and reflector on the weapon have not been shown, it being the intent there to describe only the effect of the large simple lens. It should be understood however, that the optical arrangement of FIG. 14 can be combined with any of the embodiments of FIGS. 1-3, 9, 10 and 12 interposed between the weapon muzzle and target in the manner described in connection with FIG. 14 and provide equally advantageous results.

In order to enhance the realiam of firing the weapon aiming and firing simulator, it is desirable to initiate a loud audible report or crack each time the weapon simulator is fired. While this is desirable, it is instinctive with individuals having no previous firing experience to find the loud sound objectionable. Also, since the shot sound is the primary cause of flinching by the trainee, it is desirable to have the shot sound adjustable from 0 to maximum. This eliminates the flinching problem by allowing a trainee to gradually get used to louder and louder sounds as training progresses.

Sound simulation can be accomplished in two ways. Assuming the simulator is that of an M-16 rifle, a sound recording can be made of a real M-16 firing a live round with the sound recording being made at or near the operator's head position. This recording can then be re-recorded into a continuous loop so that after each shot is fired the recorder would advance through one cycle of shot sound. This technique, although satisfactory, has inherent drawbacks. Some of the more obvious are: The requirement of synchronizing the tape with the squeeze of the trigger, the rapid tape advance needed when the weapon is in automatic, the change in sound level as the tape wears or becomes dirty and the change in tone as the speed of tape advance changes.

A solution to these problems can be achieved through the generation of a synthetic shot report, complete with its multiple echo reflection by an all electronic means. FIG. 15A is a graphical representation of the sound signature of an M-16 rifle firing live rounds of ammunition based upon analysis of a sound recording.

Figure 15:
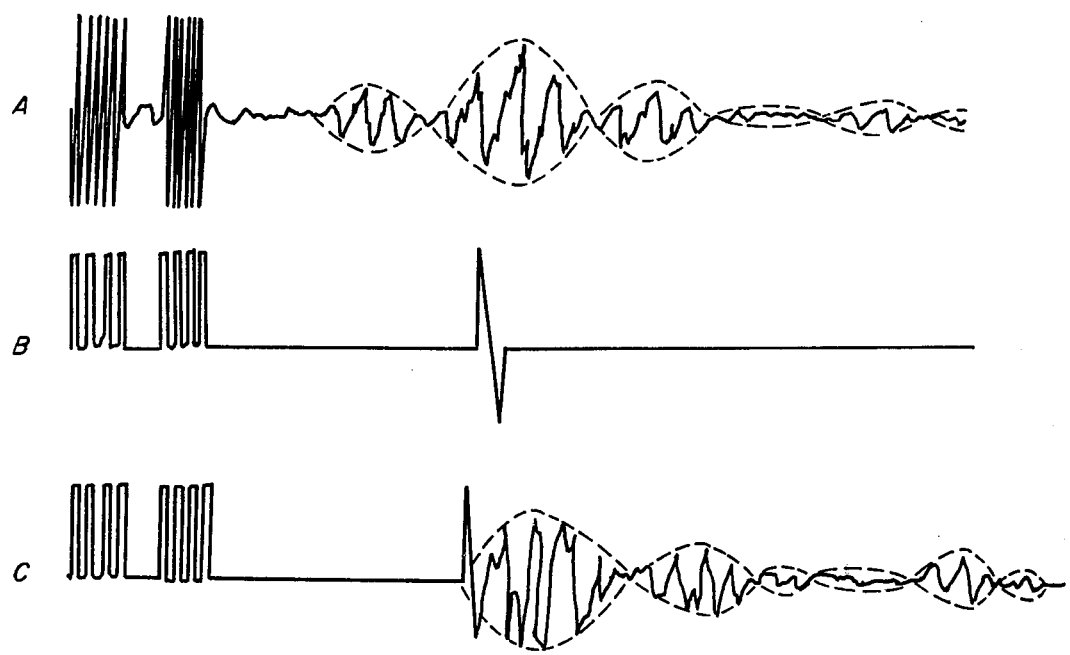
FIG. 15 is a wave diagram illustrating the sound signature of a military rifle.

As shown at A in FIG. 15, the initial report or "crack" is basically an 800 cycle audio signal grouping divided into two groups of 4 to 8 cycles each and separated by approximately 10 milliseconds between groups. The echo or reverberation following the initial report depends upon the characteristic of the surrounding terrain but follows in approximately 40 to 80 milliseconds with a reduced minor echo at 100 to 120 milliseconds.

One successful simulation of the M-16 sound is illustrated in FIGS. 15B and 15C. As can be seen, FIG. 15B is a good first approximation to FIG. 15A and FIG. 15C is very close to 15A in its characteristics. The FIG. 15B wave form was formed by an 800 cycle oscillator gated on and off to achieve two groups of four cycles followed by an echo pulse after time delay $t_d$. If the single echo pulse of FIG. 15B is applied to a commercial audio electromechanical reverberation system, the final signal is as shown at FIG. 15C.

Although the simulation when applied through speakers or earphones to the user had quite good realism, it also had drawbacks. The more obvious of the drawbacks is that commercial audio reverberation systems employ a pickoff on a long mechanical spring to generate delays and these are quite susceptible to random noise generated by mechanical vibration input and hence require vibration isolation. Also, the commercial reverberation systems are relatively large in size.

Figure 17:
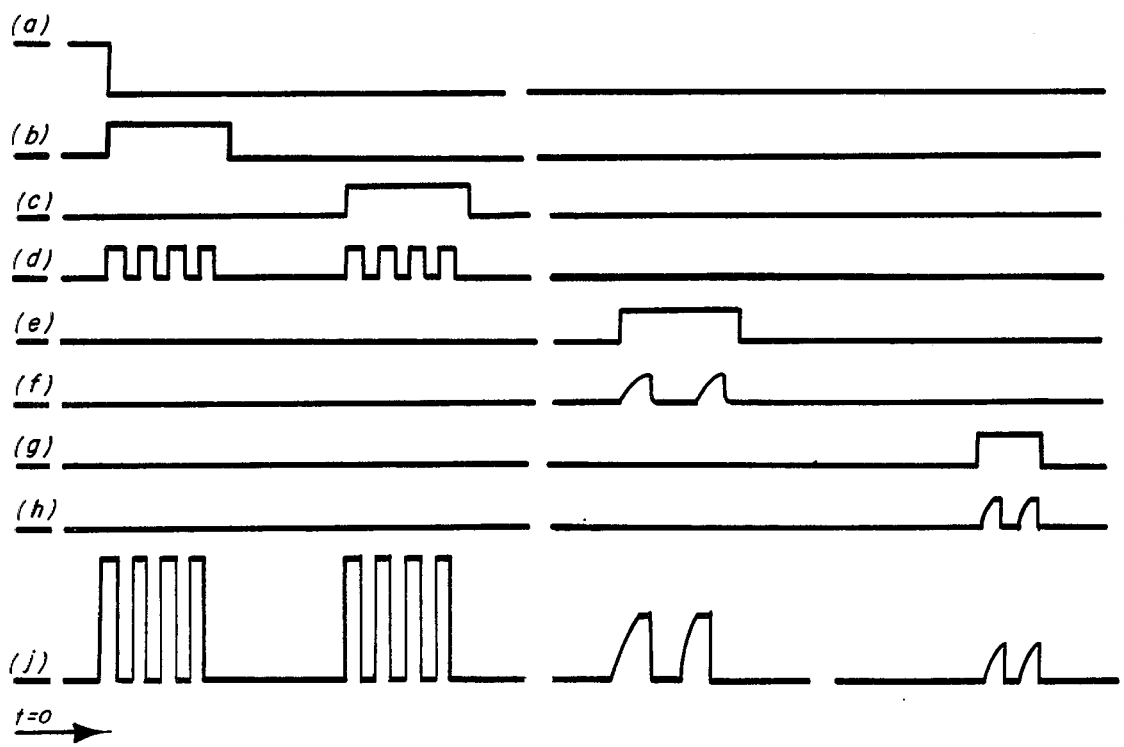
FIG. 17 shows wave diagrams illustrating signals appearing at various points in FIG. 16.
Figure 16:
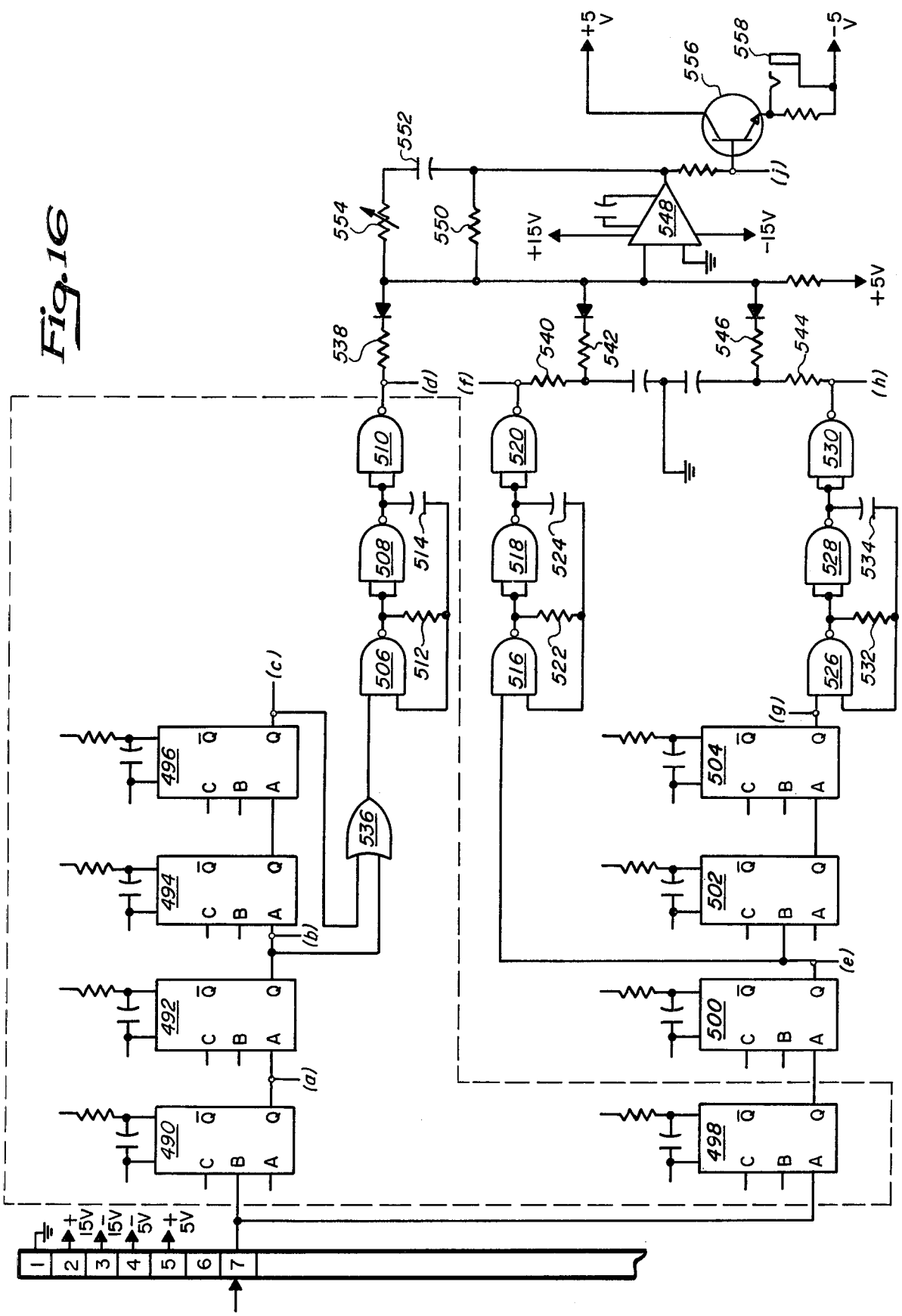
FIG. 16 is an electrical schematic diagram of a shot sound synthesizer.

To overcome the drawbacks of the partial electromechanical noise synthesizer, the completely electronic synthesizer of FIG. 16 is advantageously employed. FIG. 17 *a-j* illustrates waveforms appearing at various points in FIG. 16 indicated by corresponding letters. The time scale of FIG. 17 has been distorted for illustration purposes and is not to scale. The shot noise simulator comprises three basic sections; namely a series of 8 time delay gates, 3 oscillators and an output circuit. This synthesizer can be adapted to simulate the sound of various weapons depending on circuit parameters but, in the following description simulation of an M-16 rifle will be described. The 8 time delay gates are each advantageously one-shot multivibrators with an external RC circuit to determine the time duration of their output gates. The time delays are sequentially gated on and their output gates used to switch the various oscillators on in the proper time sequence and for an appropriate duration to simulate the weapon sound complete with following echos. An 800 Hertz oscillator is comprised of Nand Gates 506 and 508 with Nand Gate 510 functioning as an output buffer. Resistor 512 and capacitor 514 determine the 800 cycle frequency. It has been found that the initial sharp report upon firing a weapon can be successfully simulated with a frequency of between 200 – 2000 Hertz depending upon the weapon. 800 Hertz is the characteristic frequency of the M-16 rifle. The second oscillator generates a 112 Hertz output and is comprised of Nand Gates 516 and 518 with Nand Gate 520 functioning as a buffer, and resistor 522 and capacitor 524 determining frequency. The third oscillator is comprised of Nand Gates 526, 528 and 530, resistor 532 and capacitor 534 and generates a 250 Hertz output.

Shot noise synthesis begins upon receipt of a trigger pull signal at terminal B of time delay gate generator 490. This Gate is a delay prior to the initiation of the "shot" noise and simulates the actual delay a user experiences due to the time for igniting the charge and before beginning to heat the shot after pulling the trigger. As shown at "a" in FIG. 17, this delay is advantageously 60 milliseconds. At the end of the Gate 490's output, time-delay Gate generator 492 initiates its output Gate "b" and via Or Gate 536, initiates operation of the 800 cycle oscillator for approximately 5 milliseconds or 4 cycles at the output "d" of the 800 Hertz oscillator. The end of Gate 492's output initiates an 5 millisecond output Gate pulse from time-delay Gate generator 494. This delay gate is the space between the 2 groups of 800 Hertz shown in FIG. 17d. The end of the Gate pulse from time delay gate generator 494 initiates operation of time-delay Gate generator 496 which continues for about 5 milliseconds as shown at FIG. 17c. This Gate, via Or Gate 536, initiates the second group of 800 cycle pulses from that oscillator as shown in FIG. 17d.

As shown in FIG. 17, there are 2 groups of echo pulses generated by the simulator. The first is a 112 Hertz group, for 18 milliseconds. This echo pulse group is shown in FIG. 17f and its onset is delayed 120 milliseconds from the trigger pull signal by time-delay Gate generator 498. This first echos duration is determined by time-delay Gate generator 500 which is triggered on at the end of Gate 498 as shown at FIG. 17e. The second echo pulse group is 250 Hertz for 8 milliseconds following a 40 millisecond delay effected by time-delay Gate generator 502. The end of time-delay Gate 500's output initiates operation of time-delay Gate generator 502. The 8 millisecond 250 Hertz pulse group is shown at FIG. 17h and its length is controlled by time-delay Gate generator 504 as shown as FIG. 17g. Time-delay Gate generator 504 is triggered on by the end of the gate pulse from time delay 502.

Since each of the 3 oscillators of FIG. 16 generate equal amplitude square waves, it is necessary to change these amplitudes relative to each other to maintain realism. This is achieved by the appropriate summing resistors 538, 540-542 and 544-546 at the input of operational amplifier 548. Resistor 550 establishes the DC operate point of amplifier 548 and capacitor 552 establishes its AC gain in conjunction with potentiometer 554. Potentiometer 554 controls the total overall AC gain between 0 and maximum. The complete output wavetrain of amplifier 548 is shown at FIG. 17j and this is fed to power amplifier 556 and hence to jack 558 to drive the earphones or speakers. Amplifier 556 is advantageously a "darlington" type.

The above described embodiments list various combination of the inventive elements, the sensor pairs used as image center crossing detectors with their inherent ambient radiation rejection, the selective wave length focusing reflector, the scanning disc generating vertical slits traveling horizontally and horizontal slits traveling vertically, and the interposed lens providing increased simulator realism. Also the noise simulation system is shown with values to correspond to the M-16 rifle and obviously these values would change for other weapons.

From the foregoing description, it can be seen that the invention is well adapted to attain all of the ends and objects set forth together with other advantages which are obvious and inherent to the apparatus. Further, it should be understood that certain features and subcombinations are useful and may be employed without reference to other features and subcombinations. In particular, it should be understood that in several of the described embodiments there is a scanning radiation source and a stationary sensor array. However, the inverse combination of scanning sensor array and stationary radiation source will operate in a comparable manner to that of the described embodiments and, hence, are deemed to be described herein.

The detailed description of the invention herein has been with respect to preferred embodiments thereof. However, it will be understood that variations and modifications can be effected within the spirit and scope of the invention as described hereinabove and as defined in the appended claims.

What is claimed is:

1. A weapon training simulator of the type including a wieldable weapon having a trigger for controlling simulated weapon firing and a remote target scene comprising
    at least one target plane having one or more identifiable target scenes thereon,
    scanning radiation source means,
    sensor array means comprising one or more sensor bars each of which is comprised of at least one sensor pair, having output signals when irradiated,
    optical system means having an optical axis movable with respect to said target plane to permit its alignment with said identifiable target scenes, said optical system means being adapted to image said scanning radiation source means on said sensor array means when said optical axis is aligned with said identifiable target scene,
    null detection circuit means connected and responsive to said sensor array means output signals to provide output pulse signals indicative of the point of intersection of said optical axis and said target plane, and
    position detection means connected to and phased with said scanning radiation source means and connected and responsive to said output pulse signals of said null detection circuit means to provide position data for the point of intersection of said optical axis and said target plane.

2. A weapon training simulator in accord with claim 1 further comprising
    display means connected to said null detection circuit means and to said position detection means and responsive to the outputs thereof to provide a visual indication of the alignment of said optical axis with said targets.

3. A weapon training simulator in accord with claim 2 further comprising
    shot sound simulator means adapted to provide a weapon shot sound for each time the weapon simulator is fired.

4. A weapon training simulator in accord with claim 3 wherein said shot sound simulator means comprises
    plural audio oscillator means, plural time delay gates responsive to weapon trigger actuation and connected to said audio oscillator means to sequentially switch them on in the proper time sequence and for the duration necessary to simulate weapon sound and an output circuit means connected to said plural audio oscillator means and adapted to control the relative and overall output amplitude of said oscillator means.

5. A weapon training simulator in accord with claim 1 wherein said scanning radiation source means comprises means for repetitively providing moving strips of radiant energy which are long in a horizontal axis and travel vertically and are long in a vertical axis and travel horizontally.

6. A weapon training simulator in accord with claim 5 wherein said scanning radiation source means further comprises at least one rectilinear shaped scan aperture means, a source of radiation, and slotted rotating scanning disc means disposed with respect to said aperture means and said radiation source to provide said moving strips of energy.

7. A weapon training simulator in accord with claim 6 wherein said slotted rotating scanning disc means comprises a rotating disc having plural arcuate slots therein, said slots being generated about points lying substantially on the 2 axes of said scan aperture and their intersection with radial lines perpendicular thereto and extending from the center of disc rotation.

8. A weapon training simulator in accord with claim 1 wherein said sensor array comprises at least two sensor pairs arranged in two bars perpendicular to each other, each sensor pair being effectively connected in parallel opposition and the sensor pairs of each bar being effectively connected in parallel.

9. A weapon training simulator in accord with claim 1 wherein said sensor array means comprises four sensor pairs arranged in two bars to form a cross shape, each sensor pair being effectively connected in parallel opposition and the sensor pairs for each of said bars being effectively connected in parallel.

10. A weapon training simulator in accord with claim 1 wherein said sensor array means comprises at least two parallel bars each of which is comprised of $n + 1$ sensor pairs, an equal number of parallel bars each of which is comprised of $n + 1$ sensor pairs and which are disposed at right angles to said first mentioned at least two parallel bars and intersecting same equidistant from each other and from the end of each bar, the sensors comprising each of said bars being effectively connected in parallel, $n$ being the number of parallel bars running in each direction.

11. A weapon training simulator in accord with claim 1 wherein the center of each of said sensor bars of said sensor array means are located on a straight line passing through the center of a target scene area and corresponding scanning radiation source means center and on the side opposite said corresponding scanning radiation source center, said sensor array being at a distance from said target scene equal to the distance from said target scene to said corresponding scanning radiation source center.

12. A weapon training simulator in accord with claim 1 wherein said optical system means comprises focusing partial reflector means secured to and boresighted with said weapon.

13. A weapon training simulator in accord with claim 12 further comprising lens means interposed between said focusing partial reflector means and said target scene and having a focal length at least as long as the distance between it and the most remote identifiable target scene.

14. A weapon training simulator in accord with claim 1 wherein said null detection circuit means comprises hi-gain amplifier means, one for each sensor array bar and having its input connected thereto, each of said hi-gain amplifier means being responsive to said sensor array output signals, Schmitt trigger gate means, one for each of said hi-gain amplifier means, connected at its input to the output of each of said hi-gain amplifier means and conditioned to provide an output pulse signal when the image of said scanning radiation source means is centered on the sensor pairs of said sensor array bar, and position memory means connected to said Schmitt trigger gate means and to said encoder means for storing said position data present at the time of each of said output pulse signals.

15. An apparatus for automatically determining the intersection point of a line with a target plane comprising at least one target plane having at least one identifiable target scene associated therewith, scanning radiation source means, sensor array means adapted to provide output signals indicative of the position of said scanning radiation source means thereon, optical means adapted to image said scanning radiation source means on said sensor array means, said optical means having an optical axis movable with respect to said target plane and which defines said line, and circuit means connected and responsive to said sensor array means output signals and comprising position detection means to provide position data for the point of intersection of said optical axis and said target plane.

16. An automatic line-plane intersection point determining apparatus in accord with claim 15 wherein said sensor array means comprises at least two sensor pairs arranged in two bars perpendicular to each other, each sensor pair being effectively connected in parallel opposition and the sensor pairs of each bar being effectively connected in parallel.

17. An automatic line-plane intersection point determining apparatus in accord with claim 15 wherein said sensor array means comprises four sensor pairs arranged in two bars to form a cross shape, each of said sensor pairs being effectively connected in parallel opposition and the sensor pairs for each of said bars being effectively connected in parallel.

18. An automatic line-plane intersection point determining apparatus in accord with claim 15 wherein said scanning radiation source means comprises a spot source of radiation scanning in one axis and said sensor array means comprises a linear array of multiple sensors disposed at right angles with respect to said axis of said scanning radiation source means.

19. An automatic line-plane intersection point determining apparatus in accord with claim 15 wherein said scanning radiation source means comprises a spot source of radiation scanning in one axis and said sensor array means comprises a linear array of multiple sensor pairs disposed at right angles with respect to said axis of said scanning radiation source means.

20. An automatic line-plane intersection point determining apparatus in accord with claim 16 wherein
   said radiation source means comprises at least one spot source of radiation each scanning effectively in one axis, and
   said sensor array means comprises at least one sensor pair for each of said spot sources of radiation, the axis of said sensor pairs being disposed at right angles with respect to the axis of its associated scanning radiation source means.

21. An automatic line-plane intersection determining apparatus in accord with claim 15 wherein said scanning radiation source means comprises a spot source of radiation scanning in a circle and fixedly associated with said line defining optical means and said scanning radiation source means and said sensor array means are located in different planes.

22. An automatic line-plane intersection point determining apparatus in accord with claim 15 wherein said sensor array means is located remote from said target plane and fixedly associated with said line defining optical means and said scanning radiation source means is effectively located in said target plane and further comprising partially reflecting plane mirror means positioned between said target means and said scanning radiation source means and said optical means for directing radiation from said radiation source means to said optical means and permitting alignment of said optical axis with said target.

23. An automatic line-plane intersection point determining system in accord with claim 15 wherein
   said scanning radiation source means comprises separate means for repetitively providing strips of radiant energy that are long in a horizontal axis and travel vertically and strips of radiant energy that are long in a vertical axis and travel horizontally, and
   said "sensor" array means comprises at least one pair of radiation sensors for said vertically traveling strips and at least one pair of radiation sensors for said horizontally traveling strips.

24. An automatic line-plane intersection point determining system in accord with claim 23 wherein said scanning radiation source means comprises
   two rectilinear shaped scan apertures, located in said target plane,
   a source of radiation for irradiating each of said scan apertures, and
   rotating disc means interposed between said radiation source and said scan apertures, said rotating disc means having plural arcuate slots therein aligned with said scan apertures and adapted to generate said horizontal and said vertical traveling strips of radiant energy.

25. A simulator which automatically determines the intersection point of a line with a target plane comprising
   at least one target plane having at least one identifiable target scene associated therewith,
   radiation source means,
   sensor array means adapted to provide output signals indicative of the position of said radiation source means thereon,
   optical means adapted to image said radiation source means on said sensor array means, said optical means comprising partially reflecting focusing reflector means and having an optical axis movable with respect to said target plane and which defines said line, said line intersecting said target plane at a point, and
   circuit means connected and responsive to said sensor array means output signals and comprising position detection means to provide position data for the point of intersection of said optical axis and said target plane.

26. A weapon training simulator in accord with claim 25 further comprising
   lens means interposed between said optical means and said target plane and having a focal length at least as long as the distance between it and the most remote target plane.

27. An automatic line-plane intersection point determining apparatus in accord with claim 25 wherein
   said radiation source means is non-scanning, and
   said sensor array means is adapted to repetitively scan said radiation source image.

28. An automatic line-plane intersection point determining apparatus in accord with claim 27 wherein said scanning sensor array scans in a circle.

29. A scanning radiation source comprising
   radiation source means,
   stationary plate means having one or more rectilinear apertures therein,
   slotted scanning disc means,
   means for rotating said slotted scanning disc means, said slotted scanning disc means being disposed between said radiation source means and said stationary plate means to provide repetive linear moving strips of radiant energy, said slots being arcuate and being generated about points lying substantially on the two axes of said rectilinear apertures and their intersection with radial lines perpendicular thereto and extending from the center of disc rotation.

30. In a method for automatically determining the intersection point of a line with a target plane having at least one identifiable target scene by means of an apparatus of the type including a scanning radiation source, a sensor array comprising one or more pairs of radiation sensors comprising sensor bars responsive to said scanning radiation source to provide signals indicative of the position of the source thereon and operator movable optical imaging means for defining said line and for imaging said source on said sensor array, the improvement comprising the steps of
   effectively connecting the individual sensors of each of said sensor pairs in parallel opposition, and
   detecting when said scanning radiation source is centered on each of said sensor pairs to determine said intersection point as said operator moves said optical imaging means.

31. The method for determining the intersection point of a line with a plane set forth in claim 30 further comprising the steps of
   providing position data corresponding to the position of said scanning radiation source, and
   recording said position data at the time when said operator signals.

32. The method for determining the intersection point of a line with a plane set forth in claim 31 further comprising the steps of arranging said sensor bars perpendicular to each other and each sensor bar is comprised of at least one pair of radiation sensors.

33. The method for determining the intersection point of a line with a plane set forth in claim 32 further comprising the steps of
arranging said sensor bars in a cross shape wherein said sensor bars intersect at their center and each sensor bar is comprised of two pairs of radiation sensors.

34. The method for determining the intersection point of a line with a plane set forth in claim 31 further comprising the step of
arranging said scanning radiation source to provide moving strips of radiant energy which are long in a horizontal axis and travel vertically and are long in a vertical axis and travel horizontally.

35. The method for determining the intersection point of a line with a plane set forth in claim 31 further comprising the step of
arranging said scanning radiation source to provide moving spots of radiant energy traveling on horizontal and vertical axes.

36. The method for determining the intersection point of a line with a plane set forth in claim 31 further comprising the steps of
interposing imaging means between said target scene and said operator movable imaging means, said interposed imaging means having a focal length at least as long as the distance between it and the most remote of said identifiable target scenes.

37. The method for determining the intersection point of a line with a plane set forth in claim 30 further comprising the steps of
continuously providing changing position data corresponding to the momentary position of said scanning radiation source, and
storing said changing position data for a fixed length of time prior to and including the time when said operator signals.

* * * * *